June 13, 1933.    A. S. REYNOLDS    1,913,511
METEOROLOGICAL INDICATOR
Filed Oct. 10, 1925    3 Sheets-Sheet 3
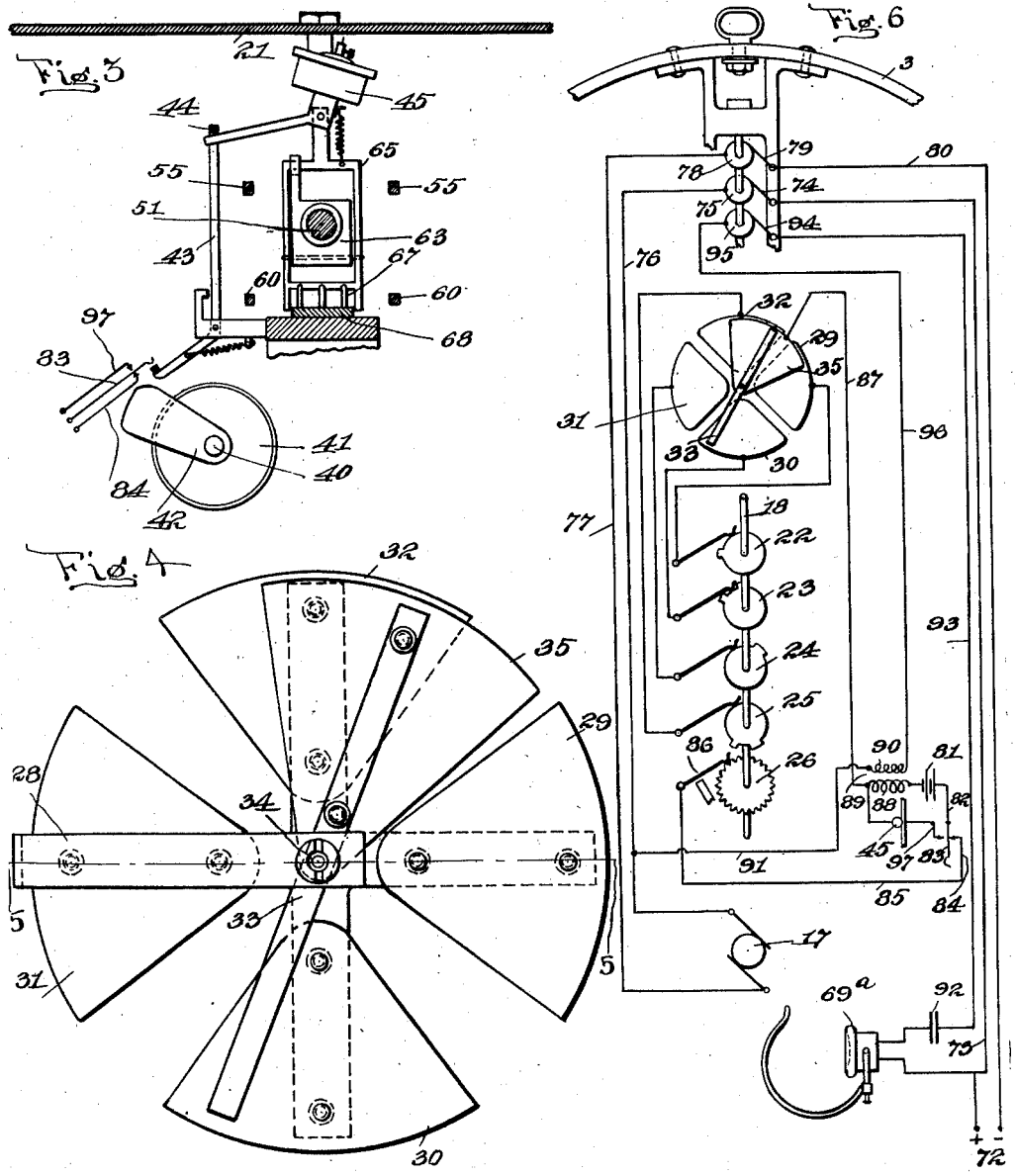

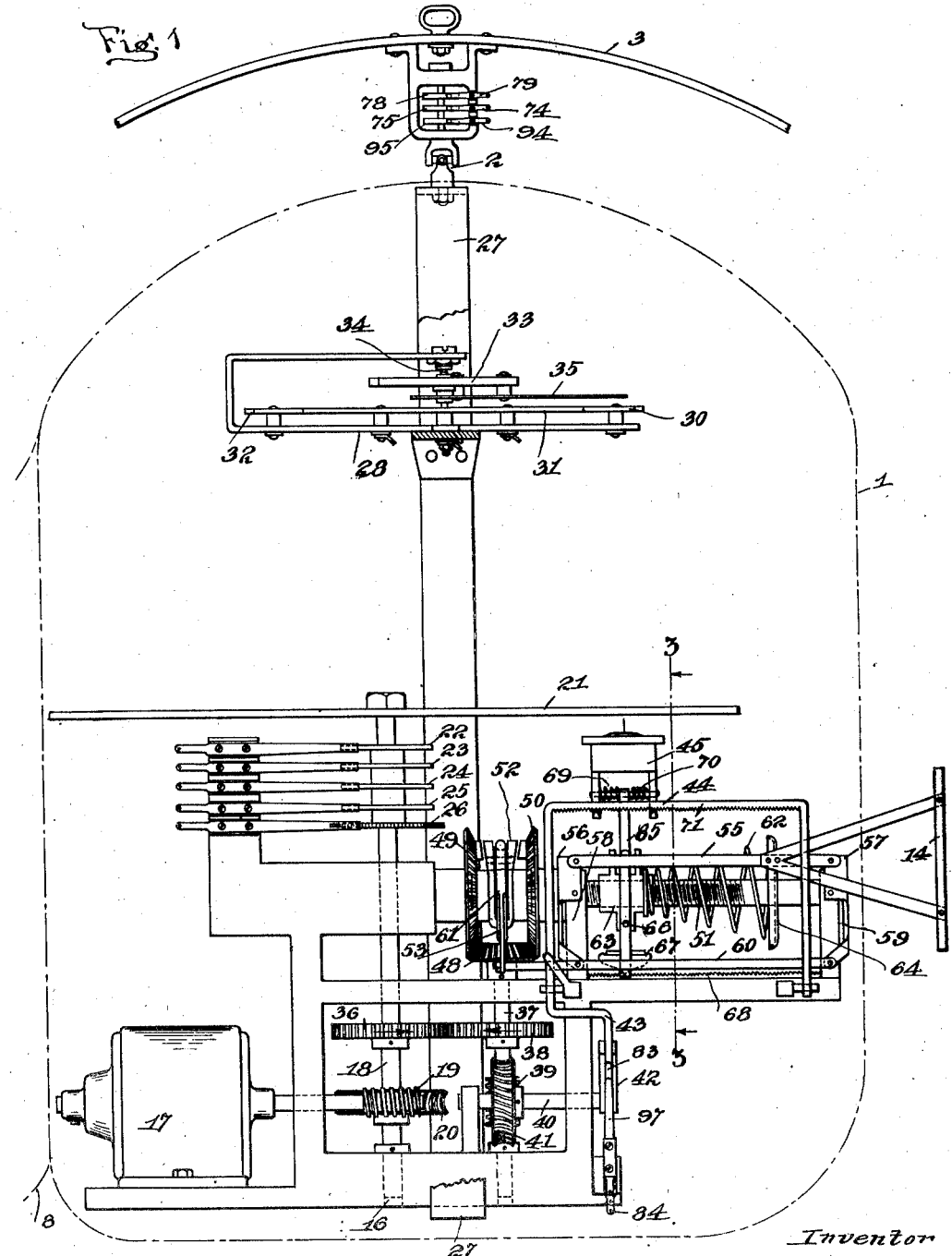

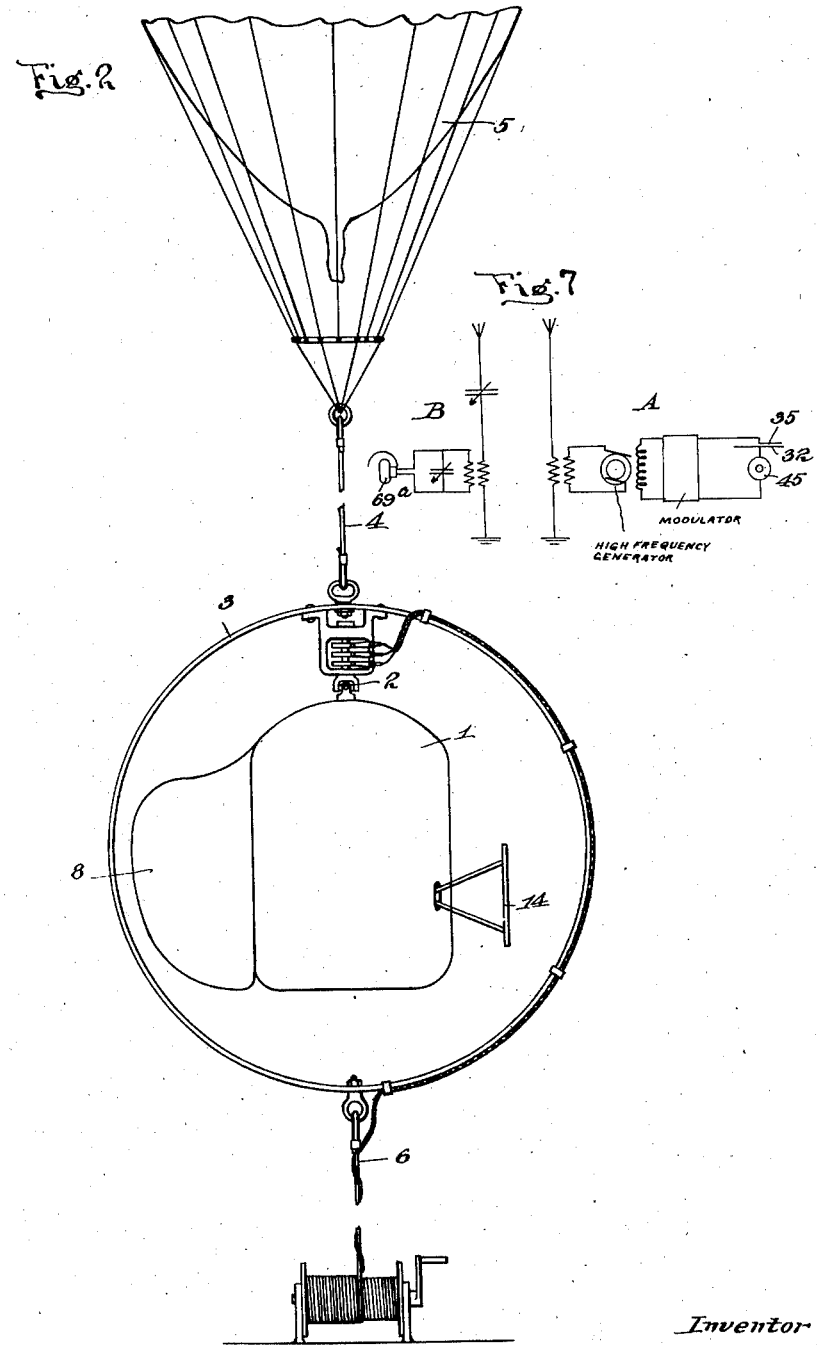

Patented June 13, 1933

1,913,511

UNITED STATES PATENT OFFICE

ANITA S. REYNOLDS, OF GREENWICH, CONNECTICUT

METEOROLOGICAL INDICATOR

Application filed October 10, 1925. Serial No. 61,802.

The invention relates to devices for determining the velocity and direction of the wind, and more particularly to a device by means of which atmospheric conditions at considerable distances above the earth's surface may be quickly and accurately determined.

The object of this invention in general is to provide means whereby wind speed indications taken at any desired altitude may be transmitted orally to an observer on the ground.

In accordance with the general features of this invention a pick-up device, carried by a captive balloon or other observation means in the strata to be explored, is automatically and selectively associated with sound reproducing means upon which are recorded in graduated relation sound variations corresponding to or characteristic of the information sought by the observer.

Other features of the invention relate to the details of the mechanism for selectively adjusting the position of the pick-up device and controlling its engagement with the record; the means for compensating for mechanical lag of the parts, and other structural details and combination of parts for attaining the objects of this invention in the most practical and efficient manner.

One embodiment of the invention is illustrated in the accompanying drawings, in which like parts are designated by similar characters of reference, and in which:

Fig. 1 is a side elevation of the device with its protecting cover removed.

Fig. 2 is an elevation of the device supported by means of a captive balloon.

Fig. 3 is a section on the line 3—3 of Fig. 1.

Fig. 4 is a plan view of the compass needle and the four direction segments corresponding to the four directions, north, south, east, and west.

Fig. 5 is a section of Fig. 4 on the line 5—5.

Fig. 6 is a plan of the circuit for operating the device.

Fig. 7 is a diagram showing the operation of the device by wireless.

In the embodiment of the invention illustrated, the device is enclosed in a protective casing and is suspended by the means of a universal joint 2, from the upper part of a ring 3. This ring is attached by means of a cable 4, to a captive balloon 5. At the lower part of the ring 3, a cable 6 maintains a connection with the ground.

In this position the device is free to revolve as the wind shifts its direction, a vane, serving to maintain a position such that a wind velocity measuring element 14, will always be held in position to receive the force of the wind.

The device as illustrated, is intended to be attached to a captive balloon, a kite or any other means of aerial suspension. It is of course understood that if desired the device may be mounted to some rigid support on the earth's surface in a manner similar to that of an ordinary weather vane.

Mounted on a framework 16 within the casing is an electric motor 17 which drives a shaft 18, by means of a worm 19 and wormwheel 20. The upper part of the shaft 18 carries a phonograph record 21, four code cams 22, 23, 24, 25, and an interrupter 26. The frame 16 is carried by a supporting frame 27 which latter is attached at its top to the universal joint 2.

In the upper part of the frame 27 there is mounted a support 28 which carries segments 29, 30, 31, 32 representing the four points of the compass. A compass needle 33 is freely pivoted on points 34 at the center of the frame, and carries on its north-seeking end a segment 35, the object of which is to transmit, by condenser action, impulses from the cams 22 to 25, these cams being wired electrically to the segments 29-32 as illustrated in Fig. 6.

A spur gear 36 on the shaft 18 drives a shaft 37 through a spur gear 38, and a worm 39 on the shaft 37 drives a shaft 40 by means of a wormwheel 41. Attached to the end of shaft 40 is a cam 42 which engages with a lever 43, causing the upper part 44 of lever 43 to raise a microphone 45 into engagement with a phonograph disc 21 carried on the end of the shaft 18.

The position of the microphone 45 with reference to the phonograph record is determined by the velocity of the wind in the following manner.

The upper part of shaft 37 carries a bevel pinion 48 which drives the two bevel gears 49, and 50, one clockwise and the other counter clockwise. The gears 49 and 50 are loosely mounted on a shaft a portion of which is screw-threaded as at 51. A clutch member 52, which is pivotally attached to shaft 51 at the point 53, will rotate said shaft either clockwise or counter clockwise depending upon whether it engages with gear 50 or with gear 49. The wind pressure vane 14, is mounted on a frame 55 which is mounted pivotally on two members 56, and 57. These two members are pivotally supported on posts 58, and 59 forming part of the frame 16. The lower ends of the members are pivoted to a frame 60, which latter supports a clutch ring 61.

With the motor operating and the wind pressure vane 14 held broadside to the wind, it will be thrust back by the pressure of the wind, moving the frame 55, backwards and through the members 56, and 57 moving the frame 60, forward, thus engaging the clutch 52 with the gear 50. This will revolve shaft 51 in the clockwise direction causing the nut 63 to move forward compressing a spring 62, against a support 64 attached to the frame 55. When the tension of the spring 62 reaches equality with the pressure of the wind against the vane 14, the latter will be moved forward slightly disengaging the clutch 52 from the gear 50 and causing the rotation of shaft 51, to cease.

When the wind pressure decreases, the spring 62, will force the vane 14, forward and allow the clutch member 52 to move back and engage with the gear 49, thus revolving the shaft 51 in the counter clockwise direction and moving nut 63, carried on the screw back until the decreased pressure of the spring again equals the pressure on vane 14 when the clutch will be moved into neutral position.

The spring 62, is calibrated in miles per hour wind speed and it will thus be seen that the position of the nut 63 will vary accordingly as the wind pressure varies.

The phonograph record, which may be of the sinuous, or "hill-and-dale" type, has recorded in its grooves a vocal record giving the miles per hour that will obtain when the nut with the microphone is in the corresponding positions. This record is made to correspond with the calibration of the instrument.

As in all devices of this character there will be slight frictional losses causing the device to read slightly lower or slightly higher than the correct reading. In order to correct for this error I have included in this device a hysteresis compensator.

This feature operates in the following manner. An arm 65, is pivotally mounted on the nut 63 at the point 66. The lower end of said arm carries a series of flexible springs 67, which engage with a roughened surface 68. Therefore with an increasing wind, as the nut advances towards the vane 14, the lower end of arm 65 is retarded, causing the upper end to move forward further than the nut 63 moves, or in other words an amount just sufficient to compensate for the frictional lag of the device. On a decreasing wind speed the arm 65 is moved in a like manner backwards towards gears 49 and 50, a slightly greater distance than the nut 63, again compensating for the frictional loss. The microphone 45 is slidably mounted on arm 65 and is held in place by two springs 69 and 70 whereby the nut 63 may move a short distance while 45 is in engagement with 21 held by the notches 71 on the under side of 44.

In determining the direction of the wind it will be seen that the compass needle 34, will point due north at all times. The device however under control of the directional vane 8, will swing with the wind thereby bringing a corresponding one of the segments 29, 30, 31, 32, directly underneath the segment 35, attached to the compass needle. This will permit the signals derived from the cam which is electrically connected to that particular segment, to pass through the circuit by electrostatic condenser action and be heard by the observer through a receiver 69$^a$.

The operation of the circuit is as follows: Current flows from a source 72 through wire 73, brush 74, collector ring 75, wire 76, motor 17, wire 77, collector ring 78, brush 79, and wire 80 to the source.

Current from a battery 81 flows through wire 82 contact spring 83, contact 84, wire 85, brush 86, interrupter 26 and through shaft 18 to the contact code cams 22, 23, 24, 25, and from these to the four corresponding compass segments 29, 30, 31 and 32. Segment 35 will be standing over one of these compass segments, and will be charged and discharged by the pulsating current from the interrupter 26. The circuit continues through wire 87, primary winding 88 of an induction coil 89 back to battery 81. This interrupted current induces a similar current flowing from the secondary 90 of a coil 89, through a wire 91, wire 76, collector ring 75, brush 74, wire 73, receiver 69$^a$, condenser 92, wire 93, brush 94, collector ring 95, wire 96 and secondary 90.

When rotation of the shaft 40 causes the cam 42 to operate the arm 43 and causing the microphone button 45 to engage the phonograph disc 21, contact spring 83 will break the circuit of the direction indicator on contact spring 84, and make contact with a spring 97, thus completing the circuit through the microphone 45.

The cams 22, 23, 24 and 25 can be cut to make any suitable code signal, but as shown they make one short pulse, two short pulses, one long pulse, and a long and short pulse respectively; representing the four points of the compass. Intermediate points will be represented by a combination of any two of the above.

In the embodiment of the invention illustrated the compass is illustrated with the cardinal points only, but it is to be understood that compasses having all of the points may, and preferably should, be employed.

Obviously the device illustrated in detail in Figs. 4 and 5 need not be a compass but the member 33, carrying the condenser element 35, may be positively driven, and signals other than the points of the compass may be transmitted.

The hysteresis compensator, and the velocity measuring mechanism are not claimed herein, but are the subject matters of my co-pending application for patent Serial No. 605,128, filed December 5, 1922, and the co-pending application for patent Serial No. 492,394 of John N. Reynolds and myself filed August 15, 1921, respectively.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described, what is claimed and desired to be secured by Letters Patent is:

1. A measuring device of the type described, including a member, means for mounting said member for movement in accordance with a force which may be subject to rapid fluctuations, calibrated spring means opposing said movement in one direction, motor operated means for stressing said spring so as to balance the force exerted thereby against the force exerted on said member, a record member provided with a plurality of speech records corresponding to the calibration of said spring and adapted to give an indication of the force exerted on the member at any selected calibration point, a pick-up device, means for moving said device with relation to the speech records, in accordance with the movement of said balancing means, means for causing the pick-up device to register with any selected speech record and for holding it from movement with respect to said record by said means, the pick-up mounting and moving means also including spring means to permit movement of the balancing means with respect to the pick-up device when held by the registering device.

2. A wind speed measuring device of the type described, including a member, means for mounting said member for movement in accordance with the force of the wind, calibrated spring means opposing said movement in one direction, motor operated means for stressing said spring so as to balance the force exerted thereby against the force exerted on said member, a record member provided with a plurality of speech records corresponding to the calibration of said spring and adapted to give an indication of the force exerted on the member at any selected calibration point, a pick-up device, means for moving said device with relation to the speech records, in accordance with the movement of said balancing means, means for causing the pick-up device to register with any selected speech record and for holding it from movement with respect to said record by said means, the pick-up mounting and moving means also including spring means to permit movement of the balancing means with respect to the pick-up device when held by the registering device.

3. A wind speed measuring device of the type described, including a vane, means for mounting said vane for movement in accordance with the force of the wind, calibrated elastic means opposing said movement in one direction, motor operated means for stressing said elastic means so as to balance the force exerted thereby against the force exerted on said vane, a record member provided with a plurality of speech records corresponding to the calibration of said elastic means and adapted to give an indication of the force exerted on the vane at any selected calibration point, a pick-up device, means for moving said device with relation to the speech records, in accordance with the movement of said balancing means, means for causing the pick-up device to register with any selected speech record and for holding it from movement with respect to said record by said means, the pick-up mounting and moving means also including elastic means to permit movement of the balancing means with respect to the pick-up device when held by the registering device.

4. A wind speed measuring device of the type described, including a vane, means for mounting said vane for movement in accordance with the force of the wind, calibrated elastic means opposing said movement in one direction, motor operated means for stressing said elastic means so as to balance the force exerted thereby against the force exerted on said vane, a record member provided with a plurality of speech records corresponding to the calibration of said elastic means and adapted to give an indication of the force exerted on the vane at any selected calibration point, a pick-up device, means for moving said device with relation to the speech records, in accordance with the movement of said balancing means, means for causing the pick-up device to register with any selected speech record and means for maintaining said registration during the reproduction of said speech record.

This specification signed and witnessed this 8th day of October, 1925.

ANITA S. REYNOLDS.